United States Patent [19]

Yagasaki et al.

[11] Patent Number: 4,531,255
[45] Date of Patent: Jul. 30, 1985

[54] WINDOW WASHER FOR A LIGHT VEHICLE

[75] Inventors: Akio Yagasaki, Tokyo; Masahiko Takenaka, Saitama, both of Japan

[73] Assignee: Honda Giken Kogyo Kabushiki Kaisha, Tokyo, Japan

[21] Appl. No.: 648,342

[22] Filed: Sep. 6, 1984

Related U.S. Application Data

[63] Continuation of Ser. No. 426,257, Sep. 29, 1982, abandoned.

[30] Foreign Application Priority Data

Oct. 22, 1981 [JP] Japan .......................... 56-157798[U]
Jul. 29, 1982 [JP] Japan ................................ 57-132699

[51] Int. Cl.$^3$ .................................................. A47L 1/00
[52] U.S. Cl. ............................. 15/250.01; 239/284 R
[58] Field of Search ........... 15/250.01, 250.05, 250.06, 15/250 A, 250 R; 239/284 R, 284 A; 280/289 S, 293; 180/219; 134/123, 198, 201

[56] References Cited

U.S. PATENT DOCUMENTS

| | | | |
|---|---|---|---|
| 1,843,828 | 2/1932 | McNaught | 239/284 R |
| 1,931,605 | 10/1933 | Dupuis | 239/284 R |
| 2,312,187 | 2/1943 | Patterson | 239/284 R |
| 2,334,508 | 11/1943 | Purden | 15/250 A |
| 2,968,071 | 1/1961 | DiPerna | 239/284 R |
| 3,295,004 | 12/1966 | Hirsch | 239/284 A |
| 3,366,336 | 1/1968 | Neuschwanger et al. | 239/284 R |
| 3,915,385 | 10/1975 | Hassinger | 239/284 A |
| 4,150,681 | 4/1979 | Howarth, Jr. | 15/250.01 X |
| 4,355,838 | 10/1982 | Hickman | 15/250 R |
| 4,372,602 | 2/1983 | Tsuchiya et al. | 280/289 S X |
| 4,461,508 | 7/1984 | Ogishima | 280/289 S X |

FOREIGN PATENT DOCUMENTS

| | | | |
|---|---|---|---|
| 523394 | 10/1953 | Belgium | 15/250.01 |
| 1913416 | 11/1969 | Fed. Rep. of Germany | 15/250.01 |
| 1655137 | 12/1977 | Fed. Rep. of Germany | 15/250.01 |
| 1117246 | 3/1956 | France | 134/198 |
| 56-39942 | 4/1981 | Japan | 15/250.01 |

Primary Examiner—Philip R. Coe
Assistant Examiner—Frankie L. Stinson
Attorney, Agent, or Firm—Irving M. Weiner; Pamela S. Burt

[57] ABSTRACT

A window washer for a light vehicle equipped with a windshield disposed in front of the steering handlebar and a wiper device for wiping the front surface of the windshield.

A washing liquid conduit member communicating with a washing liquid tank is arranged along at least a part of the periphery of the windshield and a washing liquid jet nozzle is provided at least at one position in the washing liquid conduit member. Thus, splashing of the washing liquid is substantially eliminated even when the washing liquid is delivered on the surface of the windshield during travel. Further, and the washing liquid conduit member serves as a reinforcement of the windshield.

11 Claims, 19 Drawing Figures

WINDOW WASHER FOR A LIGHT VEHICLE

This is a continuation of application Ser. No. 426,257, filed Sept. 29, 1982, and now abandoned.

BACKGROUND OF THE INVENTION

1. Field of the Invention

The present invention relates to a window or windshield washer for supplying a washing liquid to the windshield member of a light vehicle such as a motorcycle or a tricycle.

2. Description of Relevant Art

In a light vehicle such as a motorcycle having a windshield provided with a windshield washer, when a washing liquid is supplied over the front surface of the windshield from a nozzle disposed in front of the lower part of the windshield, the driver is likely to be splashed with the washing liquid carried by wind, particularly during travel, since the drops of the washing liquid are jetted out upwardly from a nozzle spaced from the front surface of the windshield. The present invention effectively overcomes such undesirable condition.

SUMMARY OF THE INVENTION

The present invention provides a window washer for a light vehicle equipped at least with a transparent windshield member disposed in front of the steering handle and a wiper unit for wiping the front surface of the windshield member, comprising at least a washing liquid tank, a washing liquid conduit member arranged along at least a part of the periphery of the windshield member and washing liquid jet nozzles formed in at least a part of the conduit member.

Accordingly, an object of the present invention is to provide a windshield washer for a light vehicle, which washer is adapted to discharge a washing liquid over the front surface of the windshield member from a position very near to the front surface of the windshield so that the washing liquid is kept from scattering even when discharged over the front surface of the windshield member during travel.

A further object of the present invention is to provide a windshield washer for a light vehicle, wherein the washing liquid conduit member also serves as a reinforcement for the periphery of the windshield member.

These and other objects and advantages of the present invention will become more apparent from the following detailed description of preferred embodiments of the present invention, with reference being had to the accompanying drawings.

DETAILED DESCRIPTION OF THE INVENTION

Figure 1:
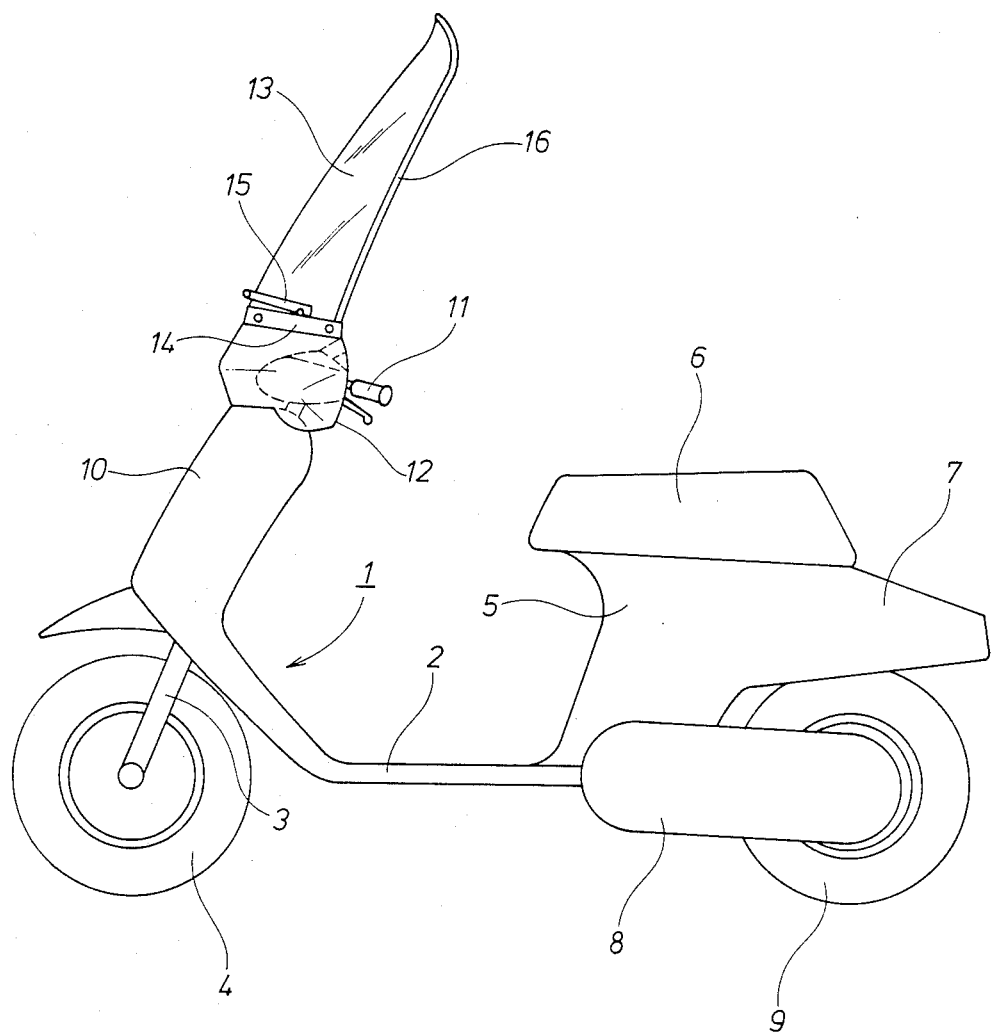
FIG. 1 is a side view of a motor scooter as an exemplary vehicle to which the window washer of the present invention is applicable.

FIG. 1 is a side elevational view of a motor scooter equipped with a window washer in accordance with an exemplary application of the present invention, however, it will be understood that the present invention is also applicable to other motorcycles, tricycles and four-wheeled automotive vehicles.

The motorcycle 1 comprises a body 1, a front fork 3, a front wheel 4 supported by the front fork 3 in front of the body 2, a seat post 5 extending upwardly from the rear part of the body 2, a seat 6 secured to the seat post 5, a rear fender 7 extending rearwardly from behind the seat 6, a swing type power unit 8 and a rear wheel 9 interlocked with the power unit 8. A front cover 10 is provided in the front part of the body above the front wheel 4. A steering handlebar 11 is connected to the front fork 3 through a steering stem, not shown, projecting upwardly from the front cover 10. The front side of the steering handlebar 11 is covered with a handlebar cover 12. A windshield 13 formed of a transparent synthetic resin or the like is supported on the handlebar cover 12 by fastening the lower end of the windshield 13 to the upper end of the handlebar cover 12 with fastening members 14. A window wiper 15 is provided on the front surface of the windshield 13 so as to swing about the lower end thereof.

Figure 2:
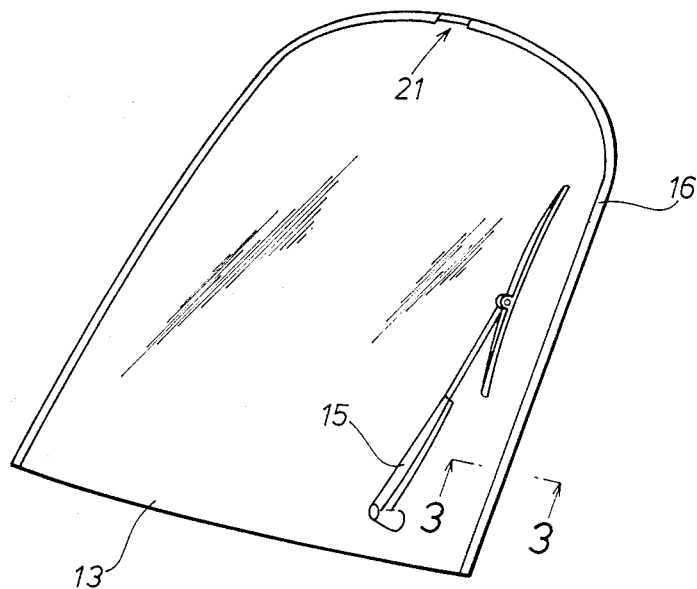
FIG. 2 is a transparent perspective view of a windshield member provided with a windshield washer according to the present invention.
Figure 3:
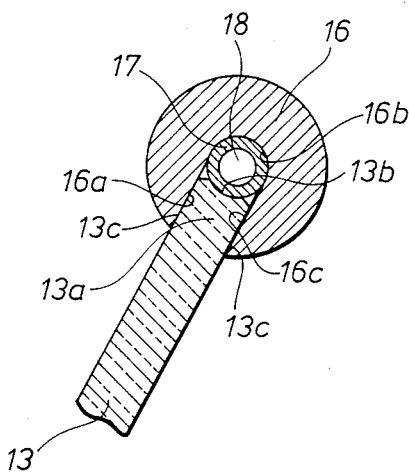
FIG. 3 is a sectional view taken along line 3—3 of FIG. 2.
Figure 4:
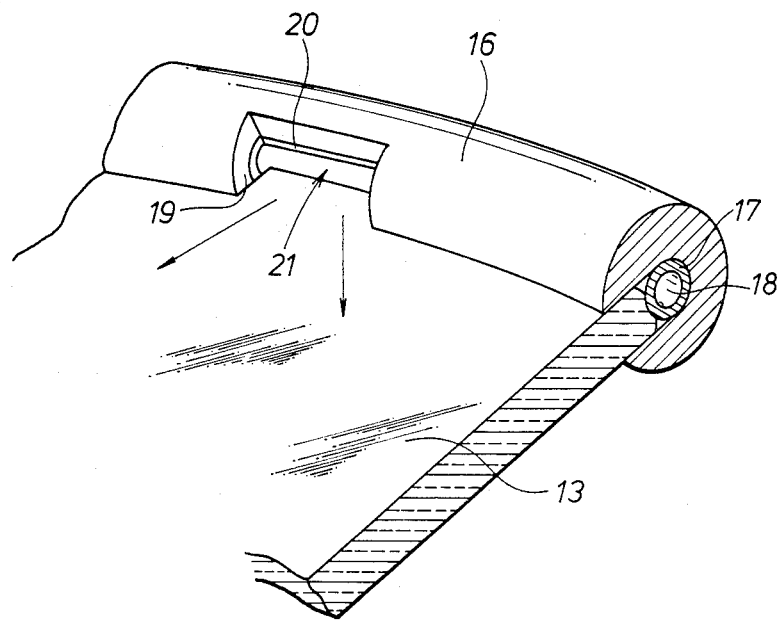
FIG. 4 is an enlarged perspective view of the washing liquid jet nozzle and the windshield member of FIG. 2.

FIGS. 2 to 4 illustrate the essential parts of the windshield 13. A separate edging member 16 is attached to the windshield 13 along the periphery 13a. The edging member 16 is an elongated member having a substantially circular cross section provided on one side thereof with a radial groove 16a extending longitudinally. The periphery 13a of the windshield 13 is received in the radial groove 16a when the edging member is attached to the windshield 13. Prior to fitting the periphery 13a of the windshield 13 in the radial groove 16a, a pipe 17 is extended along the peripheral surface 13b or the pipe 17 is embedded beforehand in the radial groove 16a with the semicircular circumference of the pipe 17 placed on the bottom surface 16b of the groove 16a so that the pipe 17 is held against the peripheral surface 13b of the windshield 13 after the periphery 13a of the windshield 13 has been received in the groove 16a of the edging member 16. The groove 16a has a sufficient depth so that the inside surfaces 16c, which are not in contact with the pipe 17, of the groove 16a are attached to the front and back sides 13c of the peripheral part 13a with an adhesive. One end of the pipe 17 is connected to a washing liquid tank, which will be described hereinbelow. The pipe 17 forms a washing liquid conduit 18. A part of the front side wall of the groove 16a of the edging member 16 corresponding to the central part of the top side of the windshield 13 is cut out to form a recess 19 of a fixed length and a part of the pipe 17 corresponding to the recess 19 is also cut to form a recess 20 so that the recesses 19 and 20 form a nozzle 21 communicating with the inside of the conduit 18 (FIG. 4).

A washing liquid is delivered onto the front surface of the windshield 13 from the top side of the windshield 13 so as to flow down along the front surface of the windshield 13, hence the driver is not liable to be splashed with the washing liquid. Furthermore, since the conduit member is provided along the periphery of the windshield, the conduit member also serves as a reinforcement for the windshield, thus increasing the rigidity of the windshield to prevent vibration and flapping.

Figure 5:
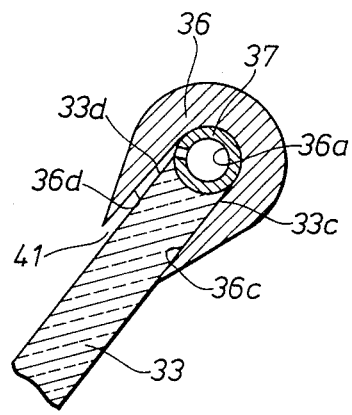
FIG. 5 is a sectional view of the peripheral part of a windshield member provided with a second embodiment of the windshield washer in accordance with the present invention.
Figure 6:
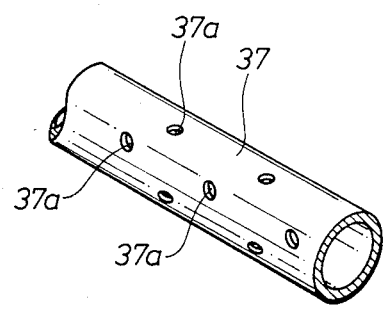
FIG. 6 is a perspective view of a part of a pipe used for the embodiment of FIG. 5.
Figure 7:
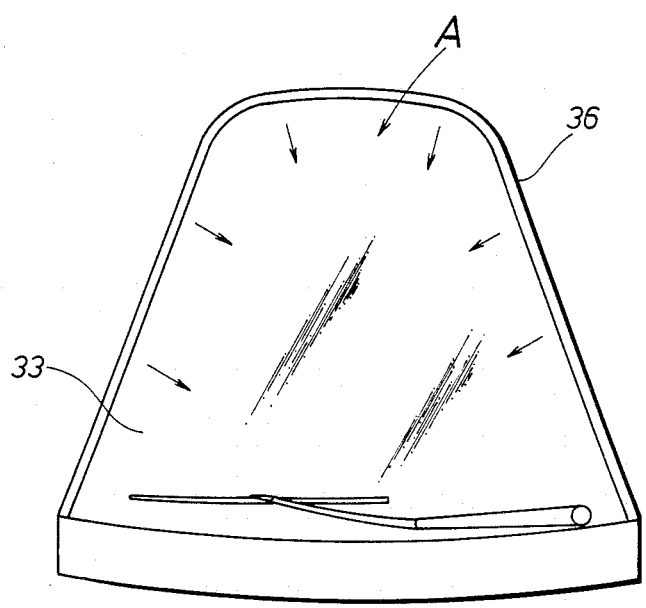
FIG. 7 is an elevational view of a windshield member provided with the second embodiment of the present invention shown in FIG. 5.

FIGS. 5 to 7 illustrate the second embodiment of the present invention, in which a pipe 37 to be disposed along the peripheral surface of a windshield is embedded within the groove 36a of an edging member 36 attached along the periphery of the windshield 33, which is best shown in FIG. 5. In this embodiment, the rear wall 36c of the groove 36a is attached to the rear side 33c of the windshield 33 with an adhesive, while the front wall 36d of the groove 36a facing the front side 33d of the windshield 33 is not attached to the front side 33d, and a sufficient clearance is formed between the inside surface of the front wall of the groove 36a and the front surface 33d of the windshield 33 to provide a passage 41 for the washing liquid.

As best shown in FIG. 6, a plurality of apertures 37a are formed in the pipe 37 along the length thereof so that the washing liquid supplied through the pipe 37 is delivered from the apertures 37a over the front surface 33d of the windshield through the passage 41. The passage 41 formed between the front surface 33d of the windshield and the inside surface of the front wall 36d of the groove 36a may be formed along substantially the periphery of the upper half A of the windshield 33 (FIG. 7).

Figure 8:
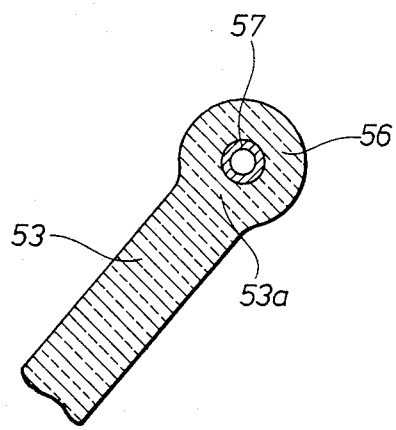
FIG. 8 is a sectional view of the peripheral part of a windshield member provided with a third embodiment of the present invention.

FIG. 8 shows a third embodiment of the present invention, in which a pipe 57 is embedded in a windshield 53 along the periphery 53a thereof through an injection molding process. A bead 56 is formed along the periphery of the windshield 53 so as to surround the pipe 57. Parts of the pipe 57 and the bead 56 corresponding to the central part of the upper side of the windshield are cut to form a nozzle.

Figure 9:
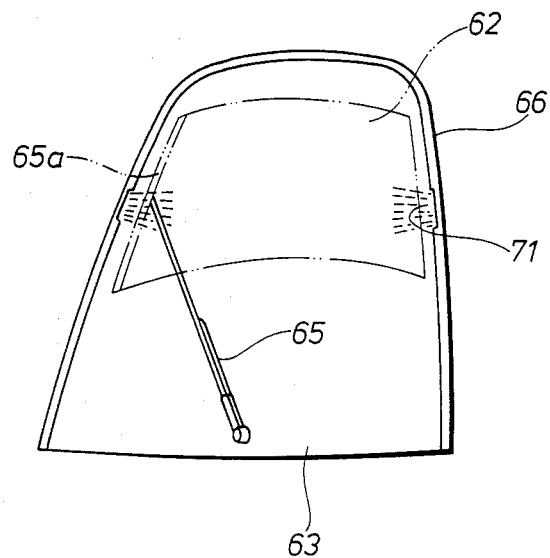
FIG. 9 is an elevational view of a windshield member provided with the third embodiment of the present invention.
Figure 10:
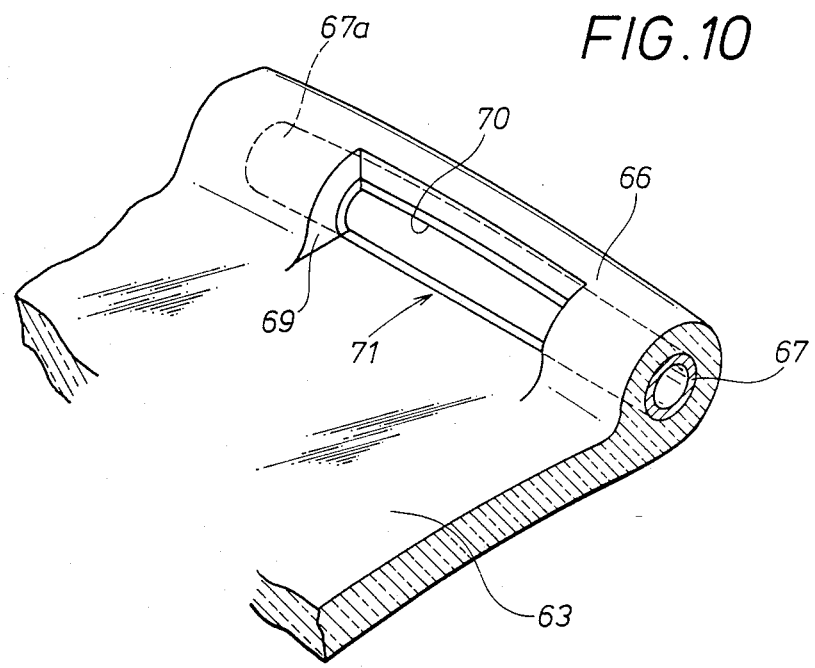
FIG. 10 is an enlarged perspective view of the washing liquid jet nozzle and the windshield member of FIG. 9.

FIGS. 9 and 10 show a modified form of the third embodiment. In the third embodiment as described hereinbefore, the washing liquid jet nozzle is formed on the upper side of the windshield 53, whereas the washing liquid jet nozzles are formed on the side edges of the windshield in the modified form of the third embodiment. Pipes 67 are embedded in a bead 66 formed integrally with the periphery of the windshield 63 in the part corresponding to the side edges of the windshield. The motion of the blade 65a of a wiper 65 covers a wiping area 62 of the surface of the windshield 63. The pipes 67 extend from the bottom of the windshield 63 along the side edges of the windshield 63 and the respective upper ends 67a terminate in the side edges of the wiping area 62. A washing liquid jet nozzle 71 opening toward the wiping area 62 is formed near each upper end 67a of the pipe 67. The nozzle 71 is formed of an opening 69 formed inside of the bead 66 and an opening 70 formed in the pipe 67.

In this embodiment, since the length of the pipes 67 is shorter than that of the pipe 17 of the first embodiment, the cost of the apparatus is reduced and a washer motor of a reduced capacity can be used. Furthermore, since the washing liquid is discharged from the sides of the windshield, the driver is not likely to be splashed with the washing liquid and since the washing liquid is discharged adjacent from the wiping area, the discharged washing liquid is spread efficiently over the wiping area.

Figure 11:
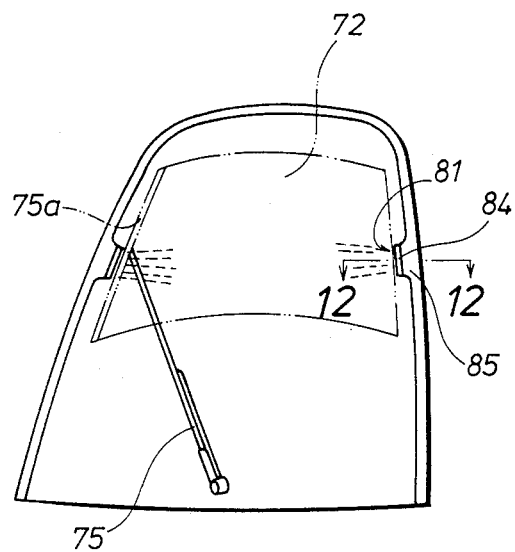
FIG. 11 is an elevational view of a modification of the windshield member of FIGS. 9 and 10,.
Figure 12:
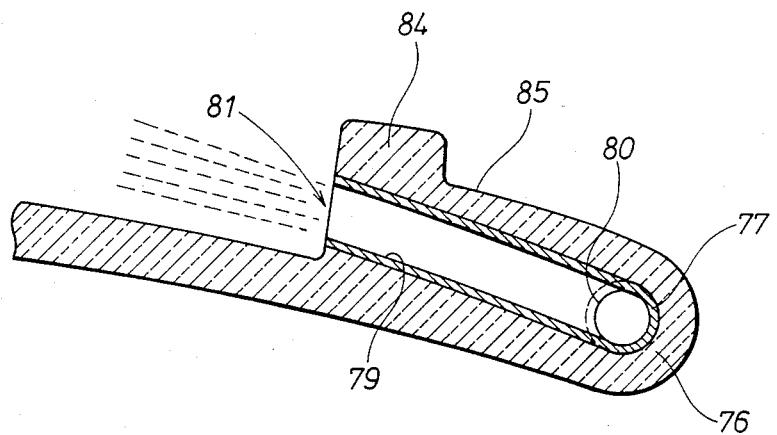
FIG. 12 is a sectional view taken along line 12—12 of FIG. 11.

FIGS. 11 and 12 show a further modification of the third embodiment, in which a washing liquid jet nozzle 81 is formed in a projection 85 having a stopper 84 for defining the range of swing motion of a wiper blade 75a and formed adjacent each side of the wiping area 72 on the surface of the windshield. Each projection 85 is formed integrally with the windshield and the bead 76 so as to project toward the wiping area. A passage 79 connecting the opening 80 of a pipe 77 and the outlet of the nozzle is formed in the projection 85.

In this modification, the wiper blade 75a abuts on the stopper 84 formed in the projection 85 at each end of the stroke so that any error in the wiping angle of the wiper blade 75a is absorbed by the stopper.

Figure 13:
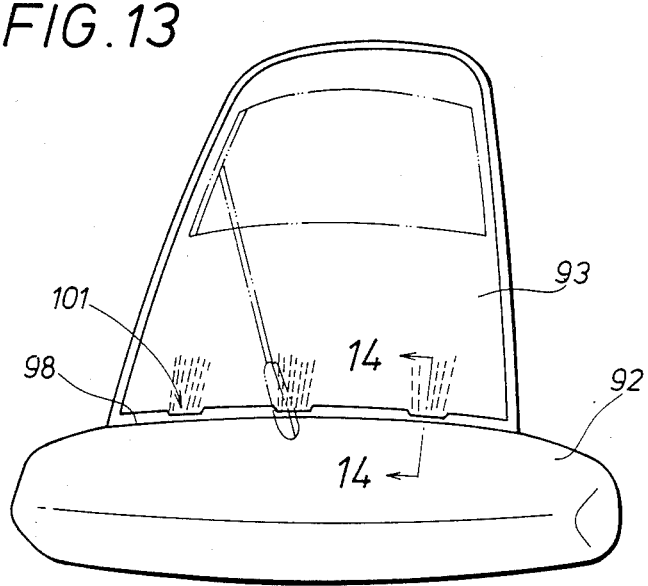
FIG. 13 is an elevational view of a windshield member provided with a fourth embodiment of the present invention.
Figure 14:
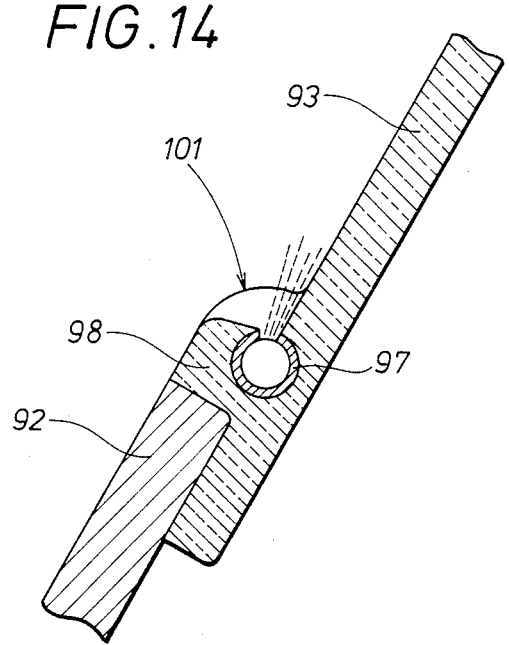
FIG. 14 is a sectional view taken along line 14—14 of FIG. 13.

FIGS. 13 and 14 show a fourth embodiment of the present invention. A lower rib 98 extending in the direction of the width of vehicle body is formed integrally with a windshield 93 in the lower part of the front surface thereof. The underside of the lower rib 98 abuts on the upper side of a handlebar cover 92. A pipe 97 is embedded within the lower rib 98. The lower rib 98 and the pipe 97 are cut at several suitable positions along the longitudinal direction thereof to form washing liquid jet nozzles 101 which are similar to those of the third embodiment.

In the fourth embodiment, the pipe connecting the washing liquid jet nozzles 101 and the washing liquid tank is required to be arranged only along the lower edge of the windshield, hence the length of the pipe can be reduced still further as compared with those of the first and second embodiments. Therefore, further reduction in the cost of the window washer and the employment of a washer motor of a reduced capacity are possible. Although the washing liquid is delivered from the lower part of the windshield 93 in this embodiment, the nozzles 101 are formed in the lower rib 98 defining the lower edge of the effective area of the windshield and the washing liquid is delivered directly over the front surface of the windshield so that with the construction of the fourth embodiment there is less likelihood that the driver will be splashed with the washing liquid carried by the wind as compared with the construction of the conventional window washer, in which the washing liquid is jetted out from a spaced-apart position toward the front of the windshield through the air. Furthermore, although the washing liquid is delivered on the lower part of the front surface of the windshield remote from the wiping area, the washing liquid is favorably diffused upwardly by the wind resulting from the forward travel of the vehicle. It is a further advantage of this embodiment that forming a lower rib along the lower edge of the front surface of a windshield effectively fills the gap between the handlebar cover and the windshield and contributes to improving the commercial value, to improving sealing between the handlebar cover and the windshield and to improving the rigidity of the windshield itself.

In the above-described embodiments of the present invention, the washing liquid tank for supplying the washing liquid to the pipes 17, 37, 57, 67, 77 and 97 is disposed behind the lower part of the windshield and held at the front upper part of the steering handlebar 11 and the washing liquid contained in the tank is supplied to the pipe through a tube by means of a motor. This arrangement will be described further with reference to FIGS. 15 to 19.

Figure 15:
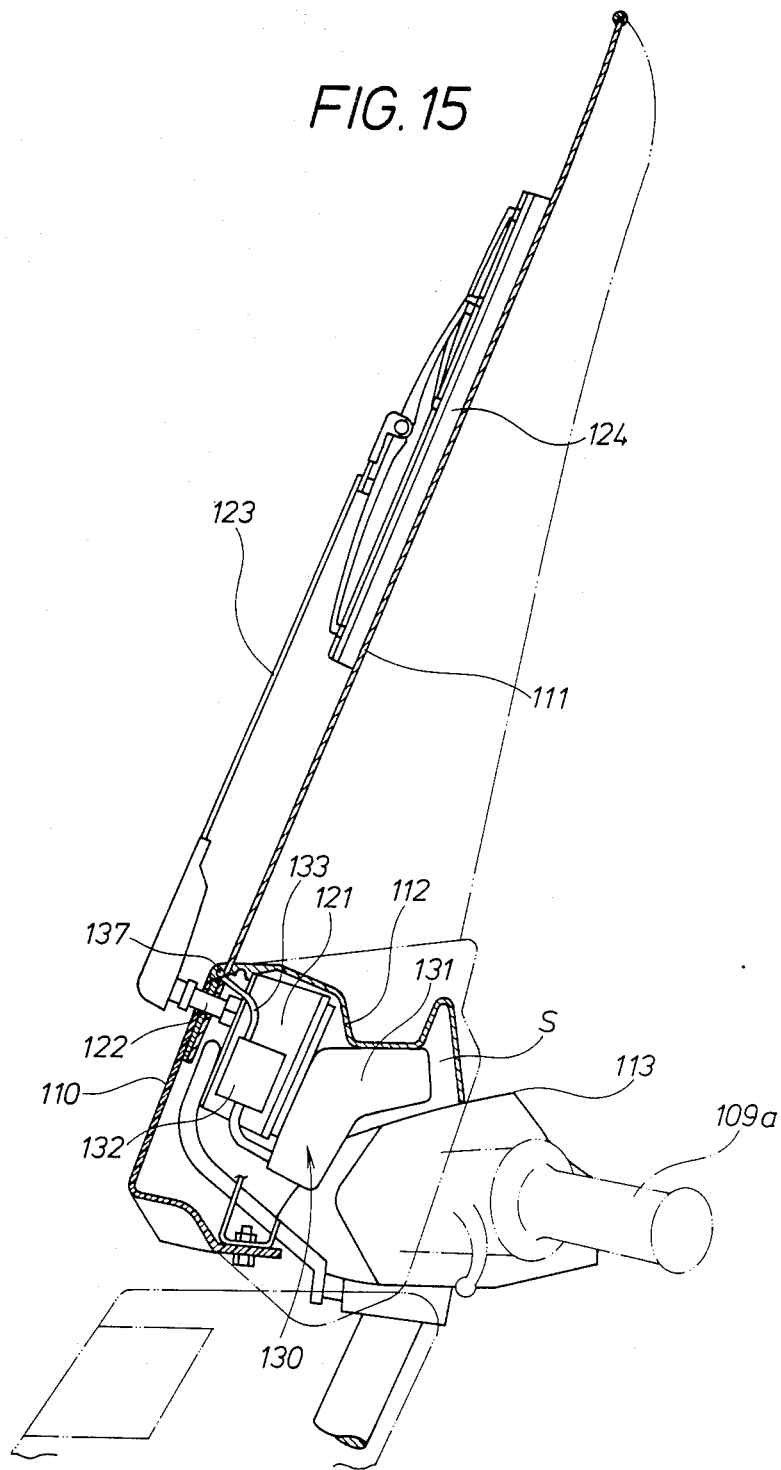
FIG. 15 is a side elevational view, partly broken-away, of the windshield washer mounted on the steering handle of a vehicle and windshield washer supporting members, illustrating the arrangement of the washer liquid tank.
Figure 16:
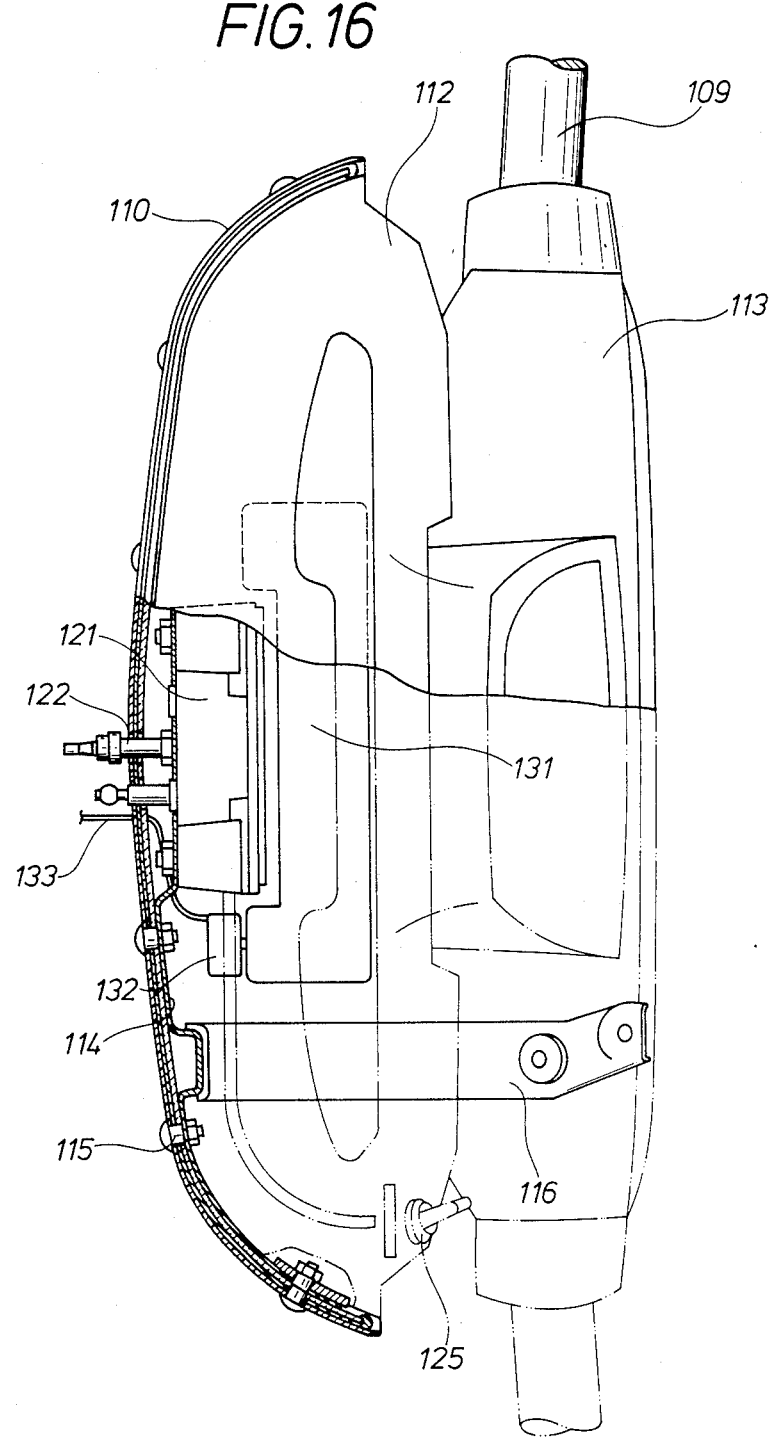
FIG. 16 is a plan view, partly broken-away, of the arrangement of FIG. 15.

Referring to FIGS. 15 and 16, a handlebar cover 110, a windshield 111 and an inner panel 112 are screwed to a supporting frame 114 with screws 115 to form an assembly. A stay 116 is fixed to the side of supporting frame 114 opposite that to which handlebar cover 110 is fixed (FIG. 16). The assembly is mounted on the body by fastening the stay 116 fixed to the supporting frame 114 to a handlebar pipe 109 so that the assembly of the handlebar cover 110, windshield 111 and the inner panel 112 turn together as the handlebar pipe 109 is turned and the windshield 111 always faces the direction of travel of the vehicle. A window wiper assembly 130 is provided for the windshield 111.

The wiper motor 121 of the window wiper assembly 130 is also mounted on the handlebar pipe 109 by being fastened to the rear side of the central part of the supporting frame 114, behind the handlebar cover 110, and is covered with the inner panel 112. A wiper blade 124 joined to the free end of an arm 123 fixed to the free end of a shaft 122 wipes the front surface of the windshield 111 as the arm 123 swings. A wiper switch 125 is disposed on the inner panel 112 near a handlebar grip 109a. The window wiper assembly 130 is incorporated into the fairing system including the handlebar cover 110, windshield 111 and inner panel 112.

As illustrated in FIGS. 15 and 16, a space S is formed between the handlebar pipe 109 and the wiper motor 121. The washing liquid tank 131 of the window washer assembly 130 is disposed within the space S.

The tank 131 is disposed adjacent to the wiper motor 121 and is attached by means of a bracket, not shown, or directly to the handlebar pipe 109. The washing liquid contained in the tank 131 is delivered through a tube 133 and a pipe 137 extended along the periphery of the windshield 111 by means of a washer motor 132 and is jetted out from nozzles over the front surface of the windshield 111.

Thus, disposing the tank 131 in front of the central part of the handlebar pipe 109 enables remarkable reduction of the length of the tube 133 connecting the tank 131 and the nozzles as compared, for example, with disposing the tank within a trunk provided in a leg shield and thereby enables reducing the cost and improving the accessibility to the tube 133. Furthermore, since the tank 131 is disposed close to the center of steering motion of the handlebar pipe 109, the provision of the tank 131 will not substantially affect the steering load.

Still further, since the electric window washer assembly 130 as described hereinbefore requires only a very short tube 133, the load of the washer motor 132 is reduced and the window washer assembly 130 can be operated effectively under a limited electrical capacity, and a washer motor 132 of a reduced size, weight and capacity can be employed. However, the present invention is not limited to the on electric window washer, and is capable of providing the same effect when a manual window washer is employed.

In disposing the tank 131 within the fairing system including the handlebar cover 110, windshield 111 and inner panel 112, the window washer assembly 130 can be incorporated into the fairing system together with the window wiper 120 as a component of the assembly. In such a case, the tank 131 is attached to the supporting frame 114 and a power source is provided when necessary. This construction remarkably improves mounting the assembly on the body.

Figure 17:
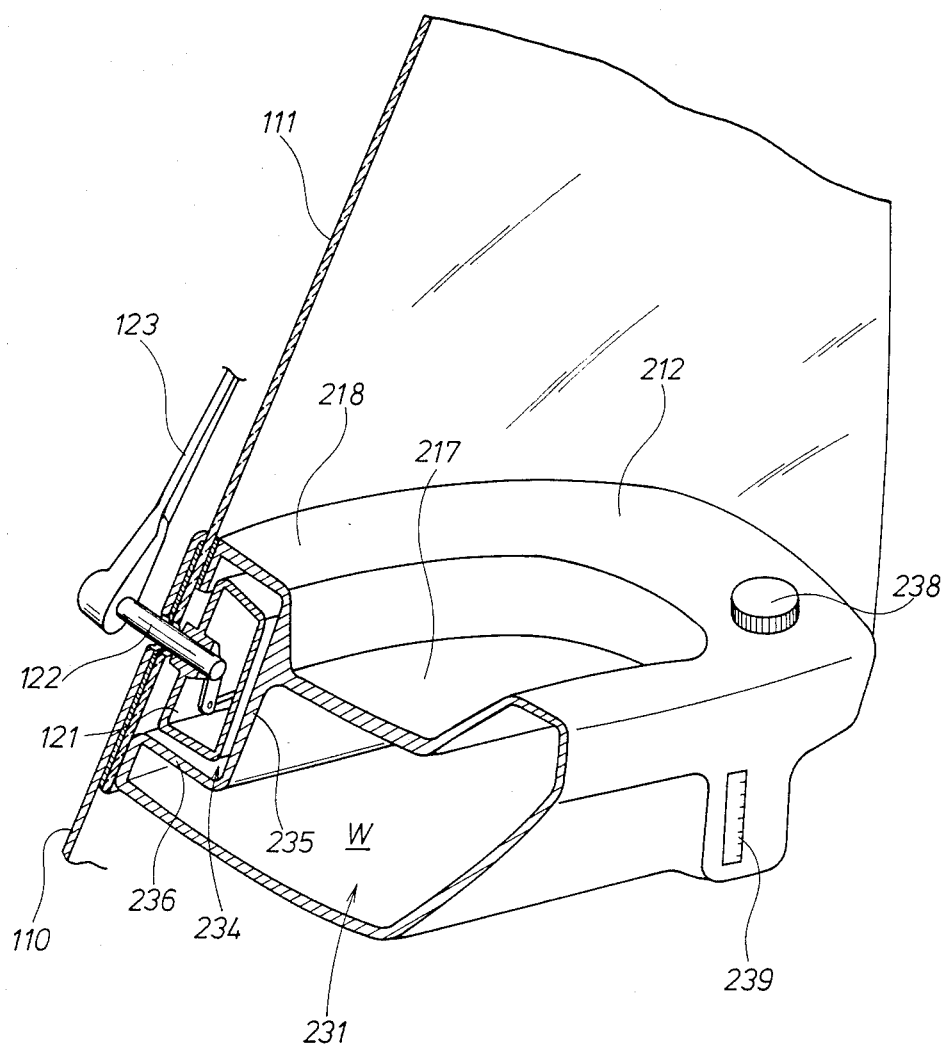
FIG. 17 is a perspective view, partly in longitudinal section, of the tank and the windshield member, in which the washer liquid tank of the windshield washer of the present invention and the inner panel are formed integrally.
Figure 18:
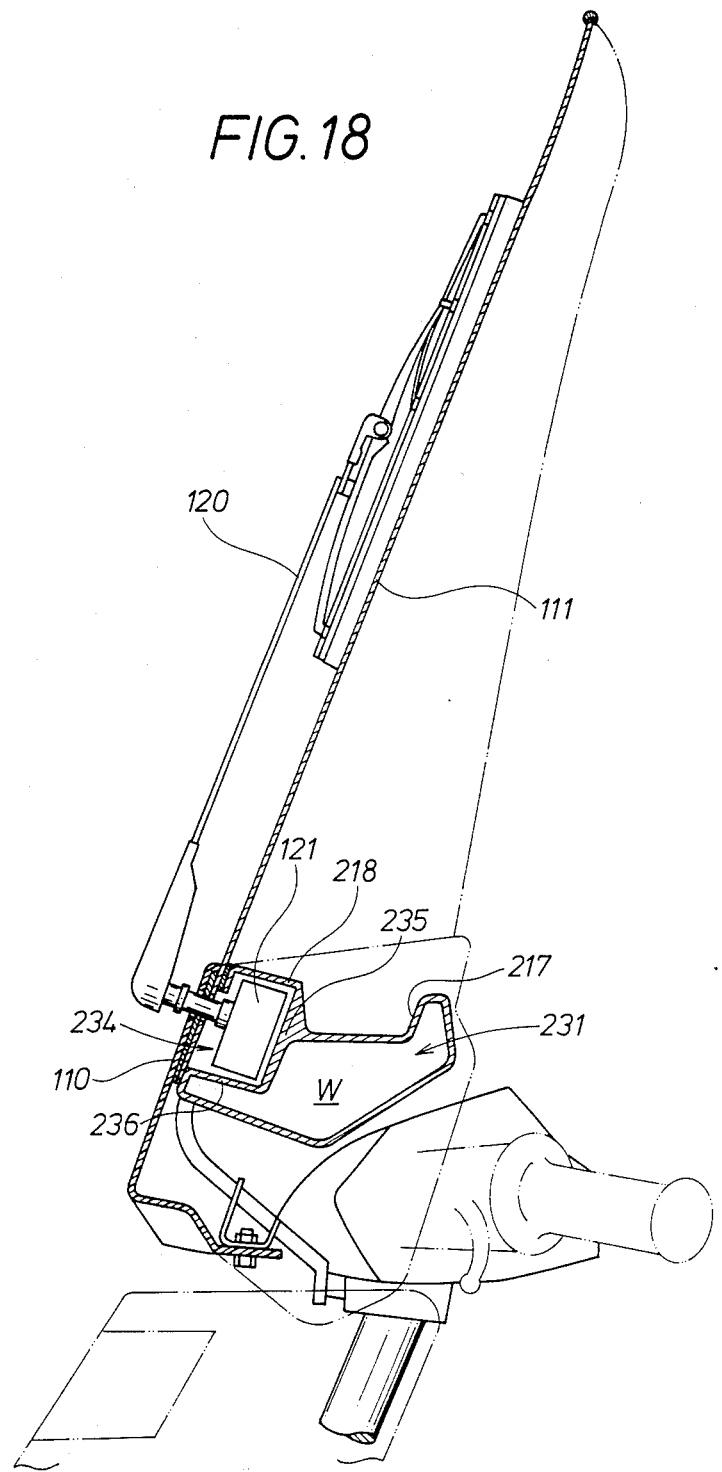
FIG. 18 is a side elevational view, partly broken-away, of the arrangement of the washing liquid tank of FIG. 17, similar to the illustration of FIG. 15.
Figure 19:
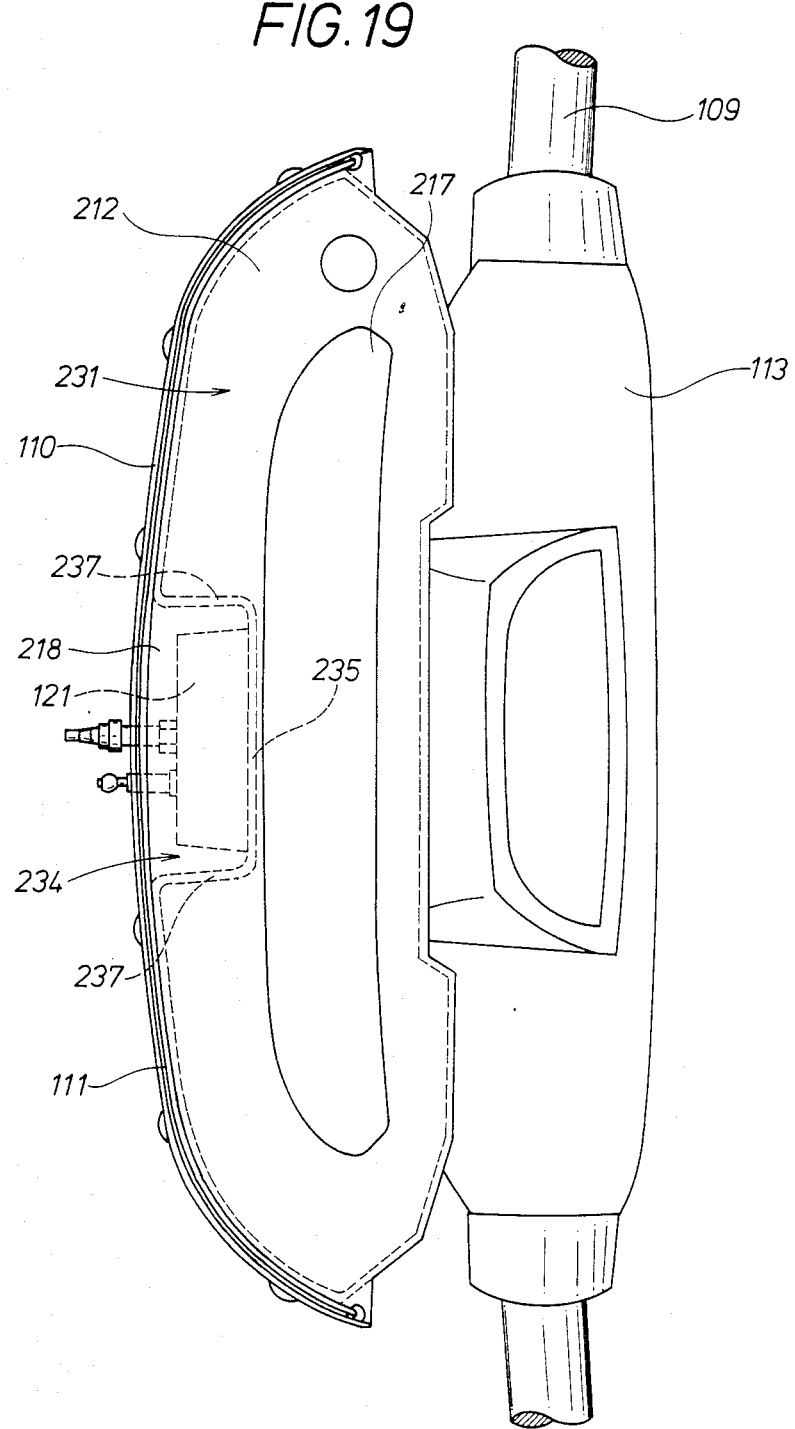
FIG. 19 is a plan view of the arrangement of FIG. 18.

In the construction as illustrated in FIGS. 17 to 19, a washing liquid tank 231 and an inner panel 212 are formed integrally and the tank 231 is formed so as to surround the motor 121 of a window wiper assembly.

Referring to FIGS. 17 to 19, the upper and back walls of the tank 231 define the inner panel 212. The motor 121 of the window wiper assembly is surrounded on all sides by the inner panel 212 and the tank 231.

A transversely extending pocket 217 is formed in the inner panel, which is an integral part of the tank 231. The central part 218 of the inner panel 212 extends forwardly over the motor 121 so as to cover the motor 121. The motor 121 is disposed within a housing 234 formed in front of the central part of the tank 231.

The housing 234 comprises a back wall 235, bottom wall 236 and side walls 237. Such walls 235, 236 and 237 also form a washing liquid chamber W on opposite sides of the housing 234.

Since the motor 121 is surrounded on opposite sides, i.e., on the rear side and lower side thereof by the washing liquid tank W, the washing liquid tank W serves, in addition to providing the aforementioned effect, to insulate the noise of the motor and to cool the motor.

Since the inner panel 212 and the tank 231 are formed integrally through molding in a closed cross section, the rigidity of the inner panel 212 is increased, and hence the respective rigidities of the junctions between the handlebar cover 110, the inner panel 212 and the windshield 111 are increased.

Furthermore, since the tank 231 and the inner panel 212 are integrated into a unitary member, a minimal number of fastening members, such as screws, are required for fitting the window washer assembly and minimal space is required for operating tools in fitting the window washer assembly whereby there is attained reduction in the number of component parts, effective utilization of the space such as a pocket and reduction in the general weight of the assembly including the accessories of the fairing system.

Provision of a washing liquid supply opening 238 at an end of the inner panel 212 forming the upper wall of the tank 231 will facilitate replenishing the tank 231 with the washing liquid so that the accessibility of the window washer is improved remarkably as compared with the conventional window washer.

Provision of a liquid level indicator 239 at a suitable position, such as a part of the back wall of the tank 231, is an inexpensive and effective way of providing a liquid level indicator, which will contribute to improve the accessibility still further.

Although a washer switch for actuating the window washer assembly has not been mentioned in the description provided hereinbefore, the wiper switch 125 may be commonly used for actuating the window washer assembly as well as the window wiper or an individual washer switch may be provided at a suitable position.

As apparent from the foregoing, according to the present invention, the surface of the windshield can be cleaned without splashing the driver with the washing liquid and at the same time, the washing liquid conduit member reinforces the periphery of the windshield and increases the rigidity of the windshield so that the vibration and flapping of the windshield are avoided. Still further, since the washing liquid tank of the window washer is disposed between the steering handlebar and the windshield, the length of the tube connecting the tank and the nozzle can be reduced so that the accessibility of the tube is improved and the steering load on the steering handlebar is not substantially affected by the provision of the window washer.

Although there have been described what are at present considered to be the preferred embodiments of the present invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

What is claimed is:

1. A window washer for a motorcycle equipped with a windshield disposed in front of a steering handlebar and a wiper device including a blade for wiping the front surface of the windshield and a wiper motor for driving said blade, comprising:
    a washing liquid tank;
    conduit means defining a passage for the washing liquid supplied from said washing liquid tank and arranged at least along a part of the periphery of said windshield;
    a washing liquid jet nozzle provided at least at one position in said conduit means;
    conduit pipe means connecting said washing liquid tank and said conduit means;
    said wiper motor being disposed in a space defined between said windshield and said steering handlebar;
    said washing liquid tank being disposed in the space defined between said windshield and said steering handlebar in proximity to said wiper motor;
    said washing liquid tank and said wiper motor being disposed in a substantially laterally central position on said motorcycle; and
    said windshield, said wiper motor and said washing liquid tank being mounted on said steering handlebar.

2. A window washer according to claim 1, wherein said conduit means comprises a pipe embedded within an edging member provided along the periphery of said windshield.

3. A window washer according to claim 2, wherein said washing liquid jet nozzle is provided at the central part of the top side of said windshield.

4. A window washer according to claim 2, wherein said washing liquid jet nozzle is provided at least on one side edge of said windshield.

5. A window washer according to claim 2, wherein said washing liquid jet nozzle comprises an opening formed in said pipe and an opening formed in said edging member.

6. A window washer according to claim 2, wherein said washing liquid jet nozzle comprises a plurality of apertures formed in said pipe and a clearance formed between said edging member and the front surface of the peripheral area of said windshield.

7. A window washer according to claim 1, wherein said windshield is provided along the bottom edge of the front surface thereof with a rib extending in the direction of the width of the vehicle body, and said pipe is embedded within said rib.

8. A window washer according to claim 7, wherein said washing liquid jet nozzle comprises an opening formed in said pipe and an opening formed in said rib.

9. A window washer according to claim 1, wherein: a handlebar cover is disposed forwardly of said steering handlebar so as to cover the front side of said steering handlebar; and
    said windowshield is formed of a transparent synthetic resin and is secured at the lower end thereof to the upper end of said handlebar cover.

10. A window washer according to claim 9, further comprising:
    a washer motor operatively cooperating with said washing liquid tank so as to deliver a washing liquid contained in said washing liquid tank to said washing liquid jet nozzle; and
    said wiper motor, said washing liquid tank and said washer motor being disposed behind said handlebar cover.

11. A window washer according to claim 10, wherein:
    said handlebar cover is connected to said handlebar by means of a stay extending from said handlebar and a supporting frame fixed on one side thereof to said handlebar cover and on the other side thereof to an extending end of said stay; and
    said wiper motor is supported by said supporting frame.

* * * * *